United States Patent [19]
Wells et al.

[11] 3,958,592
[45] May 25, 1976

[54] SAFETY SHUT-OFF VALVE

[75] Inventors: Richard E. Wells, Westminster; Victor E. Derval, Seal Beach; John D. Muchow, Cerritos, all of Calif.

[73] Assignee: Willis Oil Tool Co., Long Beach, Calif.

[22] Filed: Feb. 6, 1974

[21] Appl. No.: 440,125

[52] U.S. Cl.................................. 137/315; 92/128; 137/77; 137/237; 137/246.22; 137/269; 251/63.6; 251/291; 251/327; 277/9; 277/68
[51] Int. Cl.²................. F01B 31/00; F16K 31/122; F16K 41/04; F16K 41/14
[58] Field of Search...................... 92/128, 164, 165; 137/315, 271; 251/14, 62, 63, 63.6, 61, 327

[56] References Cited
UNITED STATES PATENTS

| | | | |
|---|---|---|---|
| 499,450 | 6/1893 | Clark | 251/63 X |
| 2,911,188 | 11/1959 | Anderson | 251/327 |
| 3,029,060 | 4/1962 | Anderson | 251/14 |
| 3,057,378 | 10/1962 | Fennema et al. | 251/327 X |
| 3,060,964 | 10/1962 | Bagwell | 251/327 X |
| 3,134,395 | 5/1964 | Glasgow | 251/61 X |
| 3,175,473 | 3/1965 | Boteler et al. | 251/61 X |
| 3,284,089 | 11/1966 | Wrenshall | 277/125 |
| 3,290,003 | 12/1966 | Kessler | 137/315 X |
| 3,541,792 | 2/1968 | Ellis | 92/165 R X |

Primary Examiner—Martin P. Schwadron
Assistant Examiner—Richard Gerard
Attorney, Agent, or Firm—Paul A. Weilein

[57] ABSTRACT

Pressurized fluid is controlled by a reverse valve gate on a valve stem that extends through annular packing in a bore of a bonnet to a piston in an outer control chamber. Control fluid pressure moves the piston inward to open the valve against line pressure on the valve and/or spring pressure on the valve. In the absence of both line pressure and control pressure, the valve is closed by spring pressure. The control chamber construction permits quick replacement of control chamber seals. In the event of a fire, the control chamber seals disintegrate to release the control pressure and thus cause line pressure and/or spring pressure to close the valve. The valve stem packing may be conveniently expelled hydraulically for replacement. Various different control assemblies may be mounted interchangeably on the valve bonnet without disturbing the structure of the valve. An auxiliary control may be quickly mounted on the outer end of the control chamber to convert the shut-off valve to manual operation.

5 Claims, 4 Drawing Figures

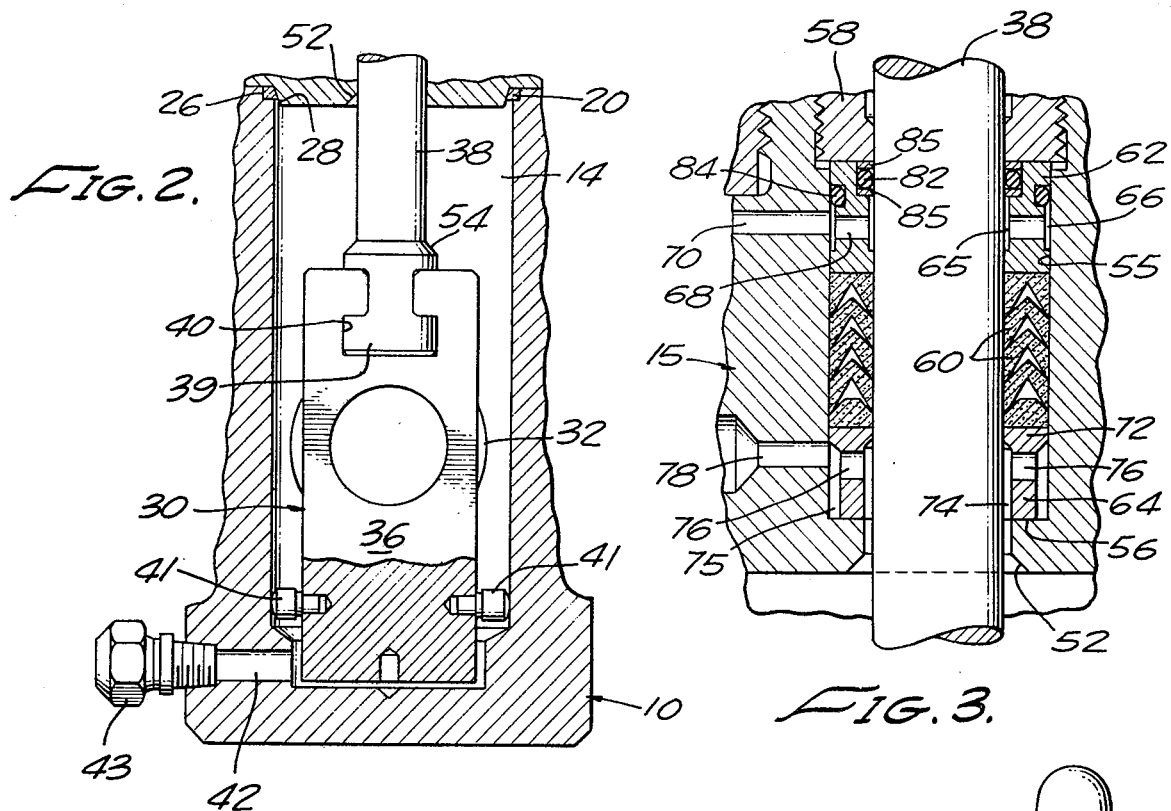
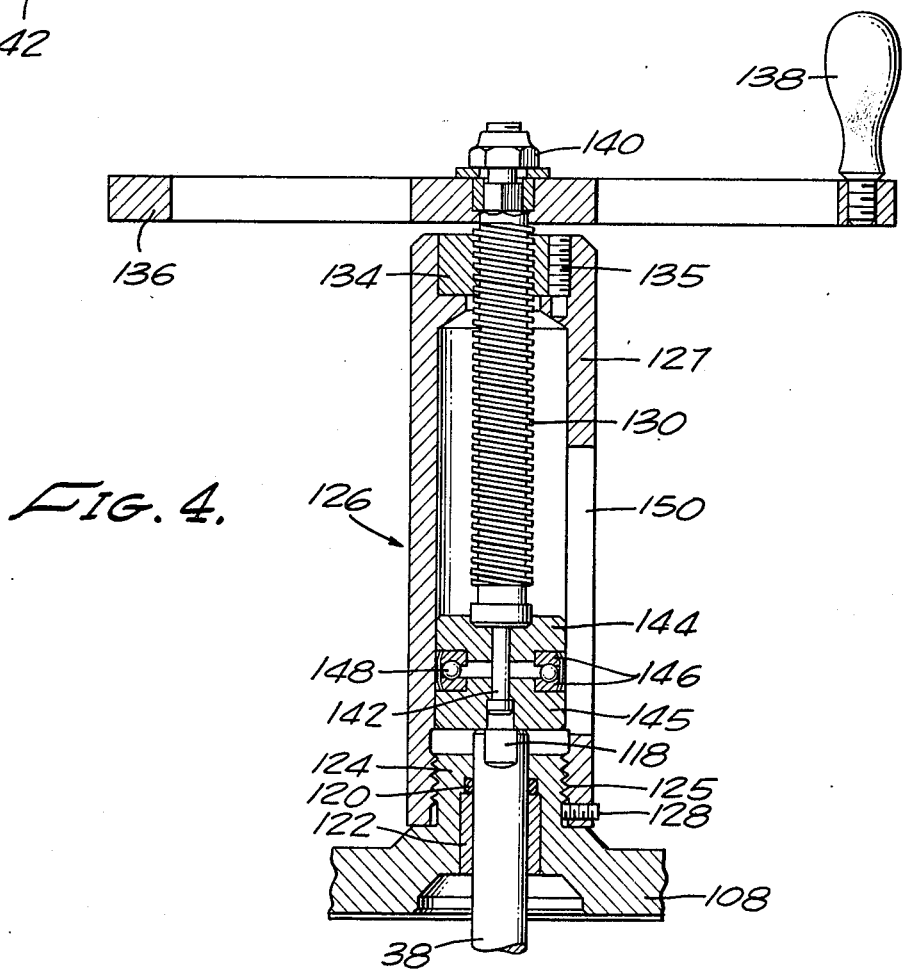

SAFETY SHUT-OFF VALVE

BACKGROUND OF THE INVENTION

Broadly described, the invention relates to a well known type of safety shut-off valve wherein the flow of pressurized fluid is controlled by a gate on a valve stem that extends through the bonnet of the valve to a piston in an outer control chamber. The shut-off valve is opened by the pressure of control fluid on the piston and in the absence of such control pressure the valve is closed in a fail-safe manner by line pressure on the valve and/or spring pressure on the piston.

The present invention is directed to certain needs for improvement in the construction and operation of such a safety shut-off valve in the petroleum and related industries.

SUMMARY OF THE INVENTION

One important object of the invention is to provide for dependable fireproof containment of the well fluid when the shut-off valve is closed. As will be explained, the valve structure provides three metal-to-metal seals that are effective for this purpose when the valve is closed. For further fire protection, normally closed leakage paths from a control chamber of the valve are opened by disintegration of elastomer seals by high temperature in the event of a fire to release fluid from the control chamber and thereby cause the shut-off valve to be closed by pressurized fluid and/or spring pressure.

Another object of the invention is a construction for the shut-off valve that provides for various control structures to be used interchangeably without the necessity of taking the valve body out of the fluid line.

Another object of the invention relates to provisions for installing an inner seal in the control chamber between the piston and the valve stem and an outer seal around the periphery of the piston with maximum convenience and minimum possibility of damage to the seals. This object is accomplished by a valve construction that facilitates the installation of the seals and makes it possible to observe the seals during critical stages in the installation procedures.

Another object of the invention is to provide guide means for the valve gate that is trouble-free because it does not require close fitting parts, including grooves or skirts that are subject to clogging.

A further object of the invention is to provide for quick and simple conversion of the automatic safety shut-off valve to manual control without dismantling the shut-off valve or even disturbing any structure whatsoever of the shut-off valve. For this purpose the invention provides an auxiliary manual control unit that may be simply screwed onto the outer end of the control cylinder.

The various features and advantages of the invention may be understood from the following detailed description and the accompanying drawings.

BRIEF DESCRIPTION OF THE DRAWINGS

In the drawings, which are to be regarded as merely illustrative:

FIG. 2 is a fragmentary sectional view taken along the line 2—2 of FIG. 1 showing how centering pins on the valve gate cooperate with the surrounding valve chamber wall;

FIG. 3 is an enlargement of a portion of FIG. 1 showing the annular packing in the valve bonnet around the valve stem; and FIG. 4 is an axial sectional view showing how an auxiliary control unit may be mounted on the outer end of the control chamber of the valve to permit manual operation of the valve gate.

DESCRIPTION OF THE PREFERRED EMBODIMENT OF THE INVENTION

Figure 1:
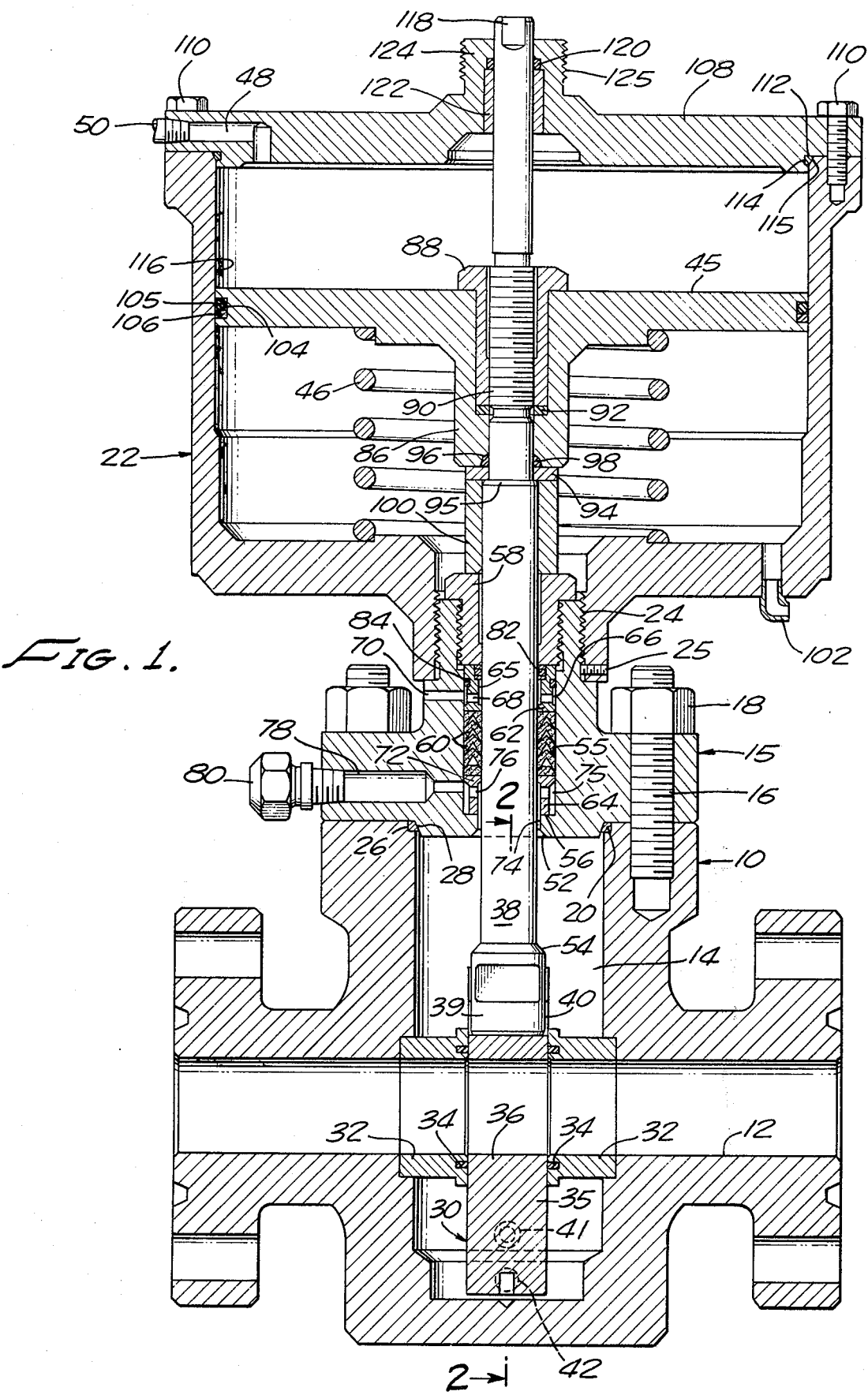
FIG. 1 is an axial sectional view of the presently preferred embodiment of the safety shut-off valve.

Referring to FIG. 1, the structure of the presently preferred embodiment of the invention includes: a valve body 10 having a flow passage 12 therethrough and a cylindrical valve chamber 14 intersecting the flow passage; a bonnet, generally designated 15, that is mounted on the valve body by studs 16 and nuts 18 with the juncture sealed by a metallic ring 20; and an outer control cylinder, generally designated 22, that is removably mounted on the bonnet by mating screw threads 24 and secured by a set screw 25. The metallic ring 20 is deformable under high pressure created by the nuts 18 and for this purpose the metallic ring is mounted in an undersized open end groove 26 and the inner end of the bonnet 15 is formed with a tapered circumferential shoulder 28 which places the metallic ring under radial compression by wedging action.

A reverse valve gate 30 cooperates with a pair of confronting cylindrical valve seats 32 that are rigidly installed with forced fit and that have circular inserts 34 which may be made of Teflon impregnated with glass. The sealing action between the valve gate and the valve seats 32 is adequately accomplished by the inserts 34 and is also independently adequately accomplished by metal-to-metal contact between the valve gate and the valve seats. The valve gate 30 has a lower blank portion 35 to seal off the flow passage 12 at the elevated position of the gate and has a circular opening 36 which registers with the flow passage 12 at the lower open position of the gate. It is apparent that the valve gate 30 is what is termed a reverse gate in that it shifts outwardly of the valve chamber 14 instead of inwardly in its movement from open position to closed position.

The valve gate 30 is mounted on the inner end of a valve stem 38 in a manner that permits the valve gate to "float", i.e., make small angular departures from alignment with the valve stem for effective sealing cooperation with the valve seat 32. For this purpose, as best shown in FIG. 2, the valve stem 38 has a T-shaped lower end portion 39 which loosely interlocks with a complementary T-shaped transverse slot 40 in the upper end of the valve gate. The two valve seats 32 confine the valve gate 30 to a plane that is perpendicular to the axis of the flow passage 12 and a pair of opposite centering pins 41 extending from the valve gate to the inner circumferential wall of the valve chamber 14 cooperate with the described T-joint to keep the valve gate centered in that plane.

A lower passage from the valve chamber 14 to the exterior of the valve body 10 is normally closed by a grease fitting 43. As will be explained, the grease fitting 43 may be opened temporarily to serve as a vent from the valve chamber.

The valve stem 38 extends through an axial bore of the bonnet 15 and when the line is under pressure, the fluid pressure in the valve chamber 14 creates an outward force on the valve stem which is the product of the line pressure and the cross sectional area of the valve stem. The valve stem is connected to a piston 45 in the control cylinder 22 which is urged outward by a coil spring 46. The upper end of the control cylinder 22 is provided with an angular passage 48 that is connected by a conduit 50 to a suitable source of control fluid (not shown). In this instance, the control fluid is pneumatic pressure. It is apparent that the valve may be closed by the pressure of control fluid on the piston in opposition to line pressure and/or spring pressure and that in the absence of control fluid pressure the valve closes by line pressure and/or spring pressure.

The inner end of the axial bore of the bonnet 15 is chambered to form a tapered valve seat 52 into which a valve member in the form of a tapered enlargement 54 of the valve stem 38 backs with tight fit when the valve gate 30 is moved to closed position by line pressure in valve chamber 14 and/or the pressure of spring 46. As best shown in FIG. 3, the axial bore of the bonnet is of stepped configuration to form an annular space 55 for packing around the valve stem 38, the inner end of the annular space being defined by an end wall 56 and the outer end of the annular space being defined by a screw threaded gland 58.

The annular packing may comprise a stack of V-rings 60 placed under compression between an axially outer packing follower 62 and an axially inner packing bushing 64. The packing follower 62 is cut away to form an inner circumferential clearance 65 around the valve stem 38 and on its outer periphery is formed with a circumferential groove 66 that is in communication with the inner clearance 65 through a plurality of radial bores 68 in the packing follower. A radial bore 70 of the bonnet 15, commonly termed a "weep hole", extends from the circumferential groove 66 to the atmosphere. Any leakage of pressurized fluid through the radial bore 70 provides visual indication that the annular packing is not fully effective.

The packing bushing 64 has a rim portion 72 to cooperate with the lower end of the stack of packing rings 60 and is cut away to form an inner circumferential clearance 74 and an outer circumferential clearance 75 which are in communication with each other through radial bores 76 in the packing bushing.

The bonnet 15 has a radial passage or injection bore 78 from the inner annular clearance space 74 to the atmosphere, the passage being of stepped configuration for screw threaded engagement with a normally closed grease fitting 80. Leakage from the annular space 55 through the gland 58 into the control cylinder 22 is blocked by an O-ring 82 in an open end groove in the upper end of the packing follower 62, the O-ring being under pressure between a pair of backing rings 85. Leakage from the annular space 55 into the threads of gland 58 and bonnet 15 is prevented by an O-ring 84 in an outer groove in the upper end of the packing follower 62.

The piston 45 is formed with a tubular extension 86 which is counterbored to receive an elongated spring nut 88 that engages a screw thread 90 on the axial stem 38. The inner end of the spring nut 88 exerts pressure against a bearing ring 92 which may be made of Delrin and the bearing ring, in turn, exerts pressure against the inner end of the piston counterbore to urge the piston against a piston thrust washer 94 that backs against a circumferential shoulder 95 of the valve stem. The end of the tubular extension 86 of the piston 45 is formed with an inner circumferential open end groove 96 to receive a sealing ring 98 that is held under axial and radial compression and is compressed against the thrust washer 94 by the spring nut 88. The groove 96 is tapered and dimensioned to compress the sealing ring 98 radially inwardly against the valve stem 38.

A stop sleeve 100 that loosely embraces the valve stem 38 cooperates with the thrust washer 94 and the packing gland 58 to limit the downward travel of the piston 45. A suitable vent 102 in the lower end of the control cylinder keeps the space below the piston 45 equalized with the atmosphere.

The piston 45 is formed with an outer circumferential groove 104 to receive an elastomer O-ring 105 together with a backup ring 106.

The outer end wall of the control cylinder 22 is in the form of a removable cover 108 that is releasably secured by a circumferential series of cap screws 110. An elastomer O-ring 112 backs against an outer circumferential groove 114 of the cover 108. The groove is undersized relative to the O-ring and the O-ring is wedged into the groove by a tapered shoulder 115 on the rim of the cylindrical wall 116 of the control cylinder.

The outer end of the valve stem 38 is formed with flats 118 to receive a wrench for immobilizing the valve stem when the spring nut 88 is to be tightened on the valve stem. The valve stem 38 is illustrated as extending through an axial bore in the cover 108 but it is to be understood that the valve stem need not extend through the cover in all embodiments of the invention.

The cover 108 is counterbored to receive an O-ring 120 which is retained by a sleeve 122 that is installed in the counterbore with a forced fit. The cover 108 is formed with an outer axial boss 124 that has an external screw thread 125 for engagement by any suitable internally threaded auxiliary equipment, for example as shown in FIG. 4. It is to be noted that the valve stem 38 protrudes beyond the axial boss 124 by a distance that is at least equal to the range of travel of the piston 45.

FIG. 4 shows an auxiliary control unit, generally designated 126, that may be used when desired to convert the shut-off valve to manual operation. The control unit 126 has a cylindrical body 127, the lower end of which is internally screw threaded to permit the unit to be screwed onto the axial boss 124 of the cover 108 and to be secured thereon by a set screw 128. A screw 130 with threads extends into the cylindrical body 127 through a stationary nut 134 that is releasably secured and held against rotation by a plurality of studs 135. A suitable hand wheel 136 provided with a crank handle 138 is suitably keyed to the outer end of the screw 130 and is releasably secured thereto by a nut 140.

Mounted on the leading end of the screw 130 by means of an axial bolt 142 is a thrust bearing that comprises a collar 144 backed against the end of the screw and a leading collar 145 for pressure abutment against the outer end of the valve stem 38. The two collars 144 and 145 are provided with corresponding confronting rings 146 which serve as races for a series of balls 148. The leading collar 145 loosely embraces the axial bolt 142 and is normally prevented from rotation by pressure abutment against the end of the valve stem 38, but the axial bolt 142 and the collar 144 are free to rotate with the screw 130. Thus, the leading end of the screw 130 is provided with a thrust bearing to keep the screw from applying torque to the valve stem 38. The cylindrical body 127 of the control unit is provided with a longitudinal slot 150 to permit observation of the advance of the screw 130 as it depresses the valve stem 38 to shift the valve stem inwardly to close the valve in opposition to the pressure of the line fluid and/or the pressure of piston spring 46.

The various advantages of the described shut-off valve construction may be readily understood in the light of the foregoing detailed description.

One important advantage is that three metal-to-metal seals are effective to contain the pressurized fluid in the flow passage 12 in a fire-resisting manner when the valve gate 30 is in its upper closed position. A first seal is the metal-to-metal contact between the metal of the blank portion 35 of the valve gate 30 and the metal of the two confronting valve seats 32; a second metal-to-metal seal is provided by the seating of the tapered enlargement 54 of the valve stem 38 in the valve seat 52 at the entrance of the axial bore of the valve bonnet 15, and the third metal-to-metal seal is provided by the metallic ring 20 at the juncture of the valve body 10 and the valve bonnet 15. With respect to leakage from the flow passage 12 upward through the valve chamber 14, the first metal-to-metal seal at the valve seat 32 is in series with the other two metal-to-metal seals at the valve seat 52 and at the metallic sealing ring 20, respectively, and the latter two metal-to-metal seals are in parallel with each other. Thus, any leakage path upward from the flow passage 12 through the valve chamber 14 is blocked by two of the three metal-to-metal seals for double protection.

With further reference to fire protection, a second advantage is that the sealing ring 105 around the piston 45 and the sealing ring 112 at the juncture of the cover 108 are both made of organic material and consequently deteriorate quickly in a high temperature created by a fire with consequent release of pressurized control fluid between the piston 45 and the cover 108, which release results in the pressurized fluid and/or spring 46 lifting the piston to close the valve gate and thus make the above mentioned three metal-to-metal seals effective.

Another advantage is that the described construction facilitates the installation or the replacement of the seals in the control cylinder 22 in a convenient manner with minimum possibility of the seals being damaged by pinching or by installation in out-of-correct positions. The sealing ring 98 between the thrust washer 94 and the piston 45 is first placed loosely around the valve stem 38 with the piston 45 and the spring nut 88 removed from the valve stem. Only reasonable care is required for correct placement of the sealing ring 98 on the thrust washer 94 in preparation for advancing the piston 45 against the O-ring by tightening the spring nut 88 and the position of the O-ring may be observed during the initial tightening of the spring nut. If the piston 45 were threaded directly on the valve stem in a common manner, it would be necessary to rotate the piston against the O-ring 98 to tighten the O-ring with probable damage to the O-ring. In the construction shown, however, the spring nut 88 is manually rotated to place the sealing ring 98 under axial compression without rotation of the piston 45, the bearing ring 92 minimizing any tendency for rotation of the spring nut to be imparted to the piston. Thus, the installation of the sealing ring 98 involves only simple axial compression of the sealing ring with minimum likelihood of damage to the sealing ring.

A unique feature is that with the cover 108 removed from the control chamber 22, the described construction permits the piston 45 to be inched axially outward under close control to a position at which the piston 45 is sufficiently exposed outside the end of the control chamber to make the circumferential groove 104 of the piston fully accessible for installation of the O-ring 105. The controlled outward inching movement of the piston is accomplished simply by applying a wrench to the flats 118 to hold the valve stem against rotation and then using a second wrench to loosen the spring nut 88 and thereby permit the spring 46 to inch the piston 45 axially outwardly. After the O-ring 105 is installed in the circumferential piston groove 104, the spring nut 88 is tightened to gradually retract the piston 45 past the rim of the cylindrical wall 116 of the control chamber and during this retraction of the piston any pinching or misalignment of the O-ring may be readily observed to make it possible to forestall any damage to the O-ring.

It is also a simple matter to install the O-ring 112 without damage to the O-ring. First, the O-ring is mounted in the shallow outer circumferential 114 of the cover 108. With the outer circumferential groove retaining the O-ring on the cover, the cover is positioned on the rim of the cylindrical wall 116 and then the cap screws 110 are installed and carefully tightened to cause the O-ring to be placed under radial compression by the tapered shoulder 115 of the rim of the control chamber.

A still further advantage of the described construction of the shut-off valve is that the two O-rings 82 and 84 effectively block leakage of fluid from the valve chamber 14 past the gland 58. By virtue of this fact it is possible to unscrew the control cylinder 22 from the bonnet 15 without loss of fluid while the line is under pressure. Thus, one control cylinder may be quickly and conveniently substituted for another without interrupting operation. If higher fluid pressure is required to cope with higher line pressure, a larger pneumatic control cylinder may be substituted or a smaller hydraulic cylinder may be substituted.

The versatility of the valve construction may be further appreciated when it is considered that, with the valve gate closed and the valve stem enlargement 54 backed into the tapered seat 52, all of the structure above the tapered seat 52 may be removed for repair or replacement. With flow through the fluid line cut off by some other valve, the bonnet 15 may be removed to permit replacement of the valve stem 38 without the necessity of replacing the valve body 10 or even replacing the valve gate 30. Thus, a manually actuated valve stem may be readily substituted for the illustrated valve stem 38.

Certain unique advantages relate to the grease fitting 43 in the valve body 10 that is shown in FIG. 2 and the grease fitting 80 in the bonnet 15. It is to be noted that the radial passage 78, which may be aptly termed an injection passage, communicates with the bottom end of the annular packing in the annular space that contains the packing rings 60.

In the first place, with the valve gate in the open position shown in FIG. 1 and with the lower grease fitting 43 open to serve as a vent, grease may be pumped through grease fitting 80, radial passage 78 and open valve seat 52 into the valve chamber 14 to lubricate the valve chamber and to reduce corrosion therein and prevent accumulation therein of foreign materials such as hydrates. In the second place, with the valve stem elevated to cause the enlargement 54 of the valve stem to seat in the tapered seat 52 to close off the lower end of the axial bore through the bonnet 15, suitable plastic can be pumped into the annular space 55 of the bonnet to repair a leak in the stack of packing rings 60. In the third place, while the valve is under full line pressure and the stem enlargement 54 is backed into the tapered seat 52, the packing gland 58 and the structure above the packing gland may be removed and then grease may be pumped through the fitting 80 into the lower end of the annular space 55 to remove the annular packing from the annular space 55 by hydraulically forcing the annular packing upward out of the annular space.

It is to be noted that the packing bushing 64 supports the stack of packing rings 60 from below and the injection passage 78 is below the stack of packing rings. The fluent material that is pumped through the injection passage communicates with the inner and outer clearances 74, 75 to urge the packing bushing 64 upward, and if separation occurs between the packing and the packing bushing the pressure of the fluent material will be applied directly to the bottom end of the stack of packing rings. Thus, quick and convenient removal of the annular packing is accomplished without the use of tools and without any possible damage to the valve stem and the axial bore of the bonnet. Removing the packing in this manner does not require removal of the control cylinder 22. In fact, the packing may be installed after the control cylinder is mounted on the bonnet.

A further advantage resides in the use of the centering pins 41 on the valve gate 30. One prior provision for guiding a valve gate comprises a fixed guide means that encircles the valve stem above the valve gate and, of course, foreign material may clog such a fixed guide means. Another prior art provision for centering or guiding a valve gate involves the use of longitudinal ribs that travel in longitudinal grooves and, here again, clogging of the guide means by foreign material becomes a problem. The present invention takes advantage of the fact that the two valve seats 32 in the valve chamber 14 confine the valve gate 20 to movement in a given plane so that the only burden placed on the centering pins 41 is to keep the valve gate centered in that plane.

A still further advantage of the described construction is, of course, the arrangement whereby the auxiliary control unit 126 may be quickly threaded onto the control chamber 22 for manual operation of the valve stem 38. No tools are required for the conversion to manual operation. The auxiliary control unit 126 may be permanently mounted for occasional use, for example, in the event that the supply of compressed air should fail or the conduit 50 should be ruptured. For such standby use of the auxiliary control unit 126, the screw 130 of the control unit is normally retracted out of the range of travel of the valve stem 38.

The detailed description herein of the presently preferred embodiment of the invention will suggest various changes, substitutions and other departures from the disclosure within the spirit and scope of the appended claims.

We claim:

1. In a valve for controlling pressurized fluid wherein: a valve body has a passage therethrough for the pressurized fluid; a valve gate on a valve stem is movable axially to move the valve gate to open and closed positions; a control chamber has a cylindrical wall and an outer end wall secured to a rim end face of the cylindrical wall; a piston in said chamber is connected to said stem for inward movement to drive the valve gate inward to one of its positions in response to fluid pressure in the control chamber; spring means in the control chamber urges the piston outwardly; and said piston has an outer circumferential groove to seat resiliently compressible annular sealing means, the improvement to facilitate installation and replacement of said annular sealing means, in which:

the outer end wall of said chamber is removable for access to the piston;

said piston is slidably mounted on said stem;

said spring means seats against the piston to urge the piston outwardly relative to the stem; and nut means in screw threaded engagement with the stem and abutting the piston to oppose axial outward movement of the piston relative to the stem, whereby, with said end wall removed, said nut means may be rotatably moved to a threadedly connected loosened position on the stem to permit the spring means to shift the piston axially outward along the stem to expose the outer circumferential groove of the piston outside the control chamber beyond the rim end face of the cylindrical wall for installation of said annular sealing means and whereby after the annular sealing means is installed in the outer circumferential groove of the piston, said nut means may be tightened on the stem to retract the piston along the stem past the rim end face of the cylindrical wall into the control chamber with the annular sealing means initially visible during the retraction of the piston to minimize the possibility of unobserved damage to the annular sealing means and to minimize the possibility of unobserved inclination of the annular sealing means out of its normal plane during the retraction of the piston.

2. An improvement as set forth in claim 1 in which said piston bears against a thrust washer and the thrust washer, in turn, bears against a shoulder of the stem;

and in which annular sealing means embraces the stem between the piston and the thrust washer whereby the stem annular sealing means may be compressed axially by tightening said nut means without the nut means imparting rotation to the piston during the tightening operation thereby avoiding damage to the stem annular sealing means by rotation of the piston against the stem annular sealing means during the tightening operation.

3. An improvement as set forth in claim 2 in which an inner circumferential groove is formed in said piston to seat said stem annular sealing means, said groove being open towards said thrust washer and being of tapered axial cross sectional configuration to compress the stem annular sealing means radially against the stem.

4. An improvement as set forth in claim 1 which includes bearing means interposed between the nut means and the piston to reduce the tendency for the rotation of the nut means to be transmitted to the piston.

5. An improvement as set forth in claim 1 in which the stem normally extends through the removable end wall with annular sealing means effective between the stem and the removable end wall.

* * * * *